United States Patent [19]
Rettig et al.

[11] 3,946,600
[45] Mar. 30, 1976

[54] ACOUSTIC EMISSION METHOD FOR DETECTION AND MONITORING OF CORROSION

[75] Inventors: Terry W. Rettig, Santa Susana; Marvin J. Felsen, Granada Hills, both of Calif.

[73] Assignee: Lockheed Aircraft Corporation, Burbank, Calif.

[22] Filed: Dec. 26, 1973

[21] Appl. No.: 427,457

[52] U.S. Cl. .............................. 73/71.4; 23/230 C
[51] Int. Cl.² .......................................... G01H 1/00
[58] Field of Search ........... 73/67, 69, 71.4, 86, 552, 73/15.4; 23/230 C, 253 C

[56] References Cited
UNITED STATES PATENTS

| | | | |
|---|---|---|---|
| 2,405,532 | 8/1946 | Todd | 73/15.4 X |
| 2,523,322 | 9/1950 | Ornstein et al. | 73/15.4 |
| 2,614,645 | 10/1952 | Wilhelm | 73/69 X |
| 2,766,838 | 10/1956 | Shanley | 73/552 X |
| 3,240,674 | 3/1966 | Ledwidge | 73/69 X |
| 3,713,127 | 1/1973 | Keledy et al. | 73/67 X |

OTHER PUBLICATIONS

H. L. Dunegan, et al. "Acoustic emission", Research/Development, May 1971 pp. 20–24.
D. M. Romrell et al., "Monitoring of Crack Growth in Ceramic by Acoustic Emission", Materials Evaluation, Dec. 1970 pp. 267–276.
H. L. Dunegan et al., "Detection of Fatigue Crack Growth by Acoustic Emission Techniques", Materials Evaluation, Oct. 1970, pp. 221–227.

Primary Examiner—Charles A. Ruehl
Attorney, Agent, or Firm—Billy G. Corber; Ralph M. Flygare

[57] ABSTRACT

A method for detecting and monitoring corrosion by sensing the spontaneous propagation of elastic waves produced in materials as the result of corrosion phenomena. Certain corrosion reactions generate elastic waves (sounds) which may be detected by sufficiently sensitive instrumentation to provide an identifiable acoustic signature. Correlation of these signatures with known standards provides a non-destructive inspection technique for monitoring invisible or hidden corrosion. In addition to acoustic emissions generated by the low-level oxidation/reduction reactions characteristic of corrosion processes, the invention includes the application of a thermal input to the test specimen to enhance the acoustic signals produced by the corrosion phenomena. By measuring the rate of acoustic pulse emission, the cumulative count of acoustic pulses generated, and the pulse amplitudes of the acoustic emissions, correlation may be made with empirically obtained data to permit failure prediction. While primarily directed to the monitoring of corrosion phenomena, the invention may also be applied to other chemical reactions characterized by acoustic emissions, such as etching, painting, electroplating, adhesive bonding, and chemical milling.

5 Claims, 10 Drawing Figures

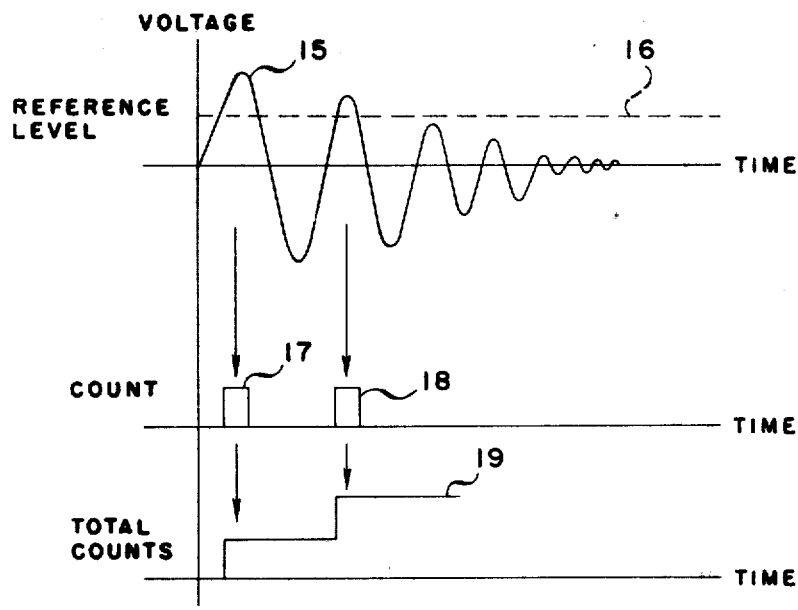
Fig. 3
Fig. 4
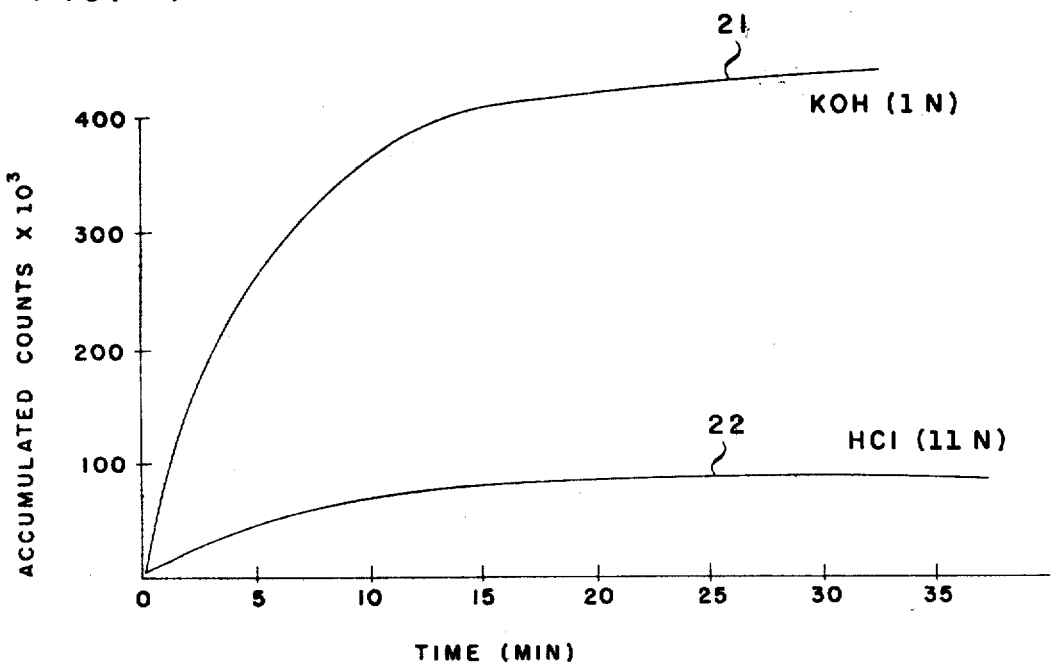

ACOUSTIC EMISSION METHOD FOR DETECTION AND MONITORING OF CORROSION

BACKGROUND OF THE INVENTION

Heretofore, acoustic emission detection techniques have been utilized for investigating mechanically-generated sounds such as produced by deformation and fracture, fatigue cracking and residual stress, and mechanically loading welds and the like. This is done by placing a sensitive microphone on the structure to be tested and then monitoring the low-level sounds which occur as a consequence of deformation, cracking, or other mechanical disturbances occurring in the specimen being tested. When the specimen is strained beyond its elastic limit, it emits a characteristic noise signal called an "acoustic emission". Detection of acoustic emission signals allows a prediction as to when the material is about to fail, and gives an opportunity to prevent the failure. It is the rapid release of kinetic energy from the deformation mechanism that propagates elastic waves from the source, and which are detected as small displacements on the surface of the material. Generally, these deformation processes include plastic flow, fracture and phase transformations. Stress corrosion cracking has also been studied by this technique, but as in other crack-formation phenomena, it is the relaxation of stress which generates the elastic waves. The present invention is a novel extention of prior concepts into the area of non-mechanically generated sounds and is directed to the non-destructive inspection for chemically induced corrosion.

Heretofore, inspection for corrosion damage has relied on such non-destructive techniques as those employing eddy currents, ultrasonics, and penetrants. Also, certain chemical techniques have been employed for corrosion detection. However, such techniques have been limited particularly with respect to their sensitivity and ability to measure small amounts of corrosion or to predict failure from the measurement of corrosion rates.

SUMMARY OF THE INVENTION

The invention relates broadly to the monitoring of certain reaction processes by acoustic emission signature correlation. The present invention detects and measures corrosion reactions by responding to elastic waves (sound) liberated as a consequence of the corrosion reaction. The elastic waves are detected by a transducer, amplified, recorded, and analyzed. By proper correlation of the acoustic signatures of the propagated sound, discrimination between types of corrosion may be obtained. The acoustic emission signals generated by corrosion reactions are characterized by a series of pulses (noise bursts) with extremely short rise times.

BRIEF DESCRIPTION OF THE DRAWINGS

FIG. 3 graphically illustrates the outputs generated by a single acoustical event, as obtained from the apparatus of FIGS. 1 and 2;

FIG. 4 graphically illustrates accumulated counts plotted as a function of time for a chemical attack process;

DESCRIPTION OF THE PREFERRED EMBODIMENT

The novel process of the invention is based upon three aspects of the underlying corrosion phenomena namely, 1) the detection of a progressing corrosion reaction, 2) the reactivation and detection of dormant corrosion damage, and 3) discriminating between types of corrosion. Each of these methods generally presents three possible types of outputs: 1) rate of emission, 2) total cumulative count, and 3) amplitude of emission. Appropriate correlation of these data permit quantitative evaluation of the extent of the corrosion as well as the prediction of failure due to corrosion.

Corrosion comprises the effects of unwanted chemical reactions on the structures and properties of metals and alloys. Corrosion, in varying degrees, occurs on all metals, alloys and other materials in practically all environments. For convenience, the cause and effects of corrosion can be categorized according to one or the other of two kinds of environments in which corrosion occurs. These environments comprise 1) liquids and solutions, and 2) gases.

Corrosion in liquids and solutions is the result of electrochemical or chemical reaction between a metal and its surroundings. Wet corrosion describes attack by liquids, and dry corrosion by gases above the dew point. Corrosion may be classified into the following nine forms as determined by the manner in which it manifests itself: galvanic corrosion, uniform corrosion, filiform corrosion, concentration-cell corrosion, pitting, intergranular corrosion, stress corrosion, dezincification, and erosion corrosion. Each of these forms of corrosion is susceptible of producing acoustic emissions.

Corrosion by gases comprises a chemical reaction which produces two effects on the metal — metal is consumed, and the metal's properties are changed. Although corrosion by gases is similar to corrosion by liquids, in gases the products of corrosion usually remain on the surface, and local electrochemical cell reactions do not occur. The rate of corrosion is not determined by the magnitude of the heat or free energy of the reaction, but by kinetic processes, such as diffusion.

The kinetics of corrosion reactions produced by gases, like those of liquids and solutions, also generate acoustical phenomena which may be detected by the novel acoustic emission method of the present invention.

Various suitable and well-known acoustic emission detection devices, such as those generally employed heretofor for the monitoring of crack propagation and other mechanical phenomena, may be used in the practice of the present novel method. Typical of such devices are systems comprising a transducer having a frequency response covering the range extending from the audio portion of the acoustic spectrum to the megahertz region. The transducer is affixed, or otherwise acoustically coupled, to the test specimen.

Figure 1:
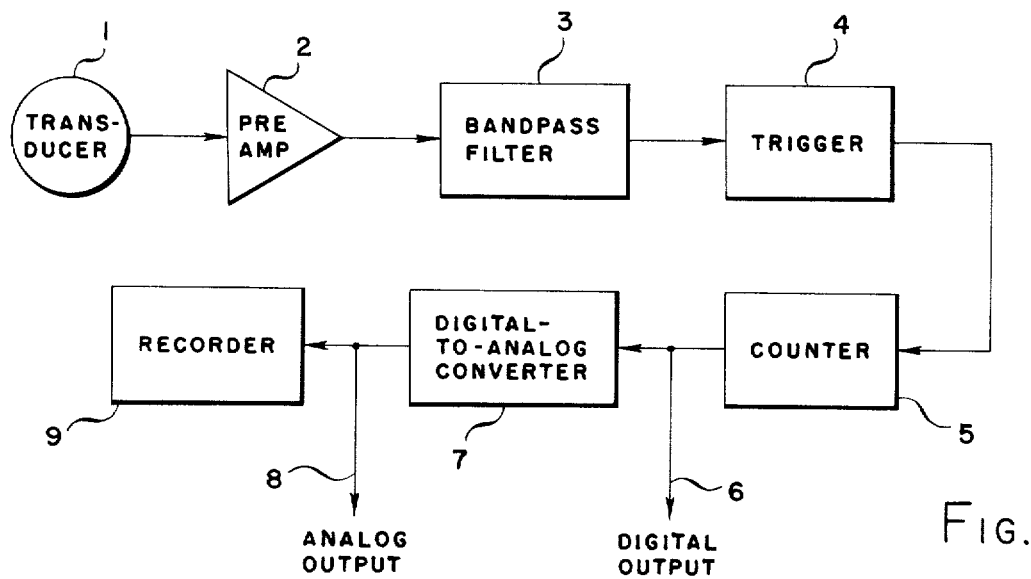
FIG. 1 is a block diagram of the basic apparatus useful in the practice of the invention.

FIG. 1 is a simplified block diagram showing typical apparaus useful in the practice of the invention. This apparatus comprises a contact microphone 1 or electroacoustic transducer adapted to be placed in contact with a corrosion test specimen. The sensing transducer 1 is preferably a piezoelectric crystal that converts low-level elastic waves to electrical signals that are amplified via preamplifier 2 and transmitted through a band-pass filter 3. The output of filter 3 is supplied to trigger 4, which in turn drives counter 5. The emitted acoustic signals are usually transient in nature and tend to ring the sensing transducer at resonance. The resulting electrical output signal is a damped sinusoid having a carrier frequency strongly dependent on the transducer's characteristics. Piezoelectric transducers have resonant peaks in their response curves, which indicate a greater sensitivity to certain frequencies than to others. This means that when a sharp (harmonic-rich) pulse excites the transducer, what is seen at the transducer output is not the pulse waveform, but rather a decaying sinusoid at a resonant frequency of the transducer.

After appropriate signal conditioning, the pulses are counted by digital counter 5 and displayed. The count may also be converted to a DC voltage via digital-to-analog converter for recording on an X-Y recorder 9. The digital output is available at terminal 6, and the analog output is available at terminal 8, for driving ancillary equipment.

Figure 2:
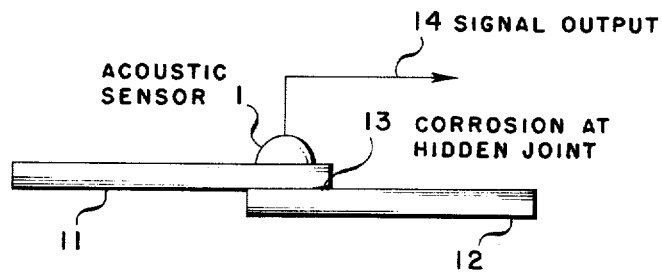
FIG. 2 diagrammatically illustrates a corrosion test specimen acoustically coupled to a sensor.

FIG. 2 shows transducer 1 in contact with metal member 11 which is joined to metal member 12 at joint 13. Hidden corrosion may possibly occur at joint 13, thereby generating an acoustic emission. The acoustic signal is transduced to an electrical signal appearing on line 14. The kinetic reaction associated with the corrosion process is discontinuous in the sense that it produces discrete pulses or bursts of acoustic energy. These elastic waves travel at the speed of sound in the material. As the acoustic pulse is reflected back and forth in the specimen, and in the transducer, it may set up standing waves, thus causing a "ringing" of the system which decays exponentially as the energy is dissipated. This effect is illustrated in FIG. 3.

The waveform 15 is obtained from the transducer 1. This waveform 15 is compared with an adjustable voltage reference level for further processing. The peak level of the signal 15 gives an indication of the magnitude of the emitted acoustic event. A single count is obtained for every cycle of the damped sine wave 15 which is above the reference level 16. Thus, there is obtained two pulses, 17 and 18, from the waveform 15. A running count 19 is derived by summing the individual pulses. As can be seen, the pulses and the accumulated total are dependent not only on the initial amplitude of the transducer signal 15, but also on the damping rate which determines the number of "ringing" cycles that are above the reference level 16. It is possible to adjust the apparatus of FIG. 1 such that only one count would be registered for each acoustic event, regardless of how long the transducer 1 rings. Adjustment of the measurement technique can provide useful correlations between naturally occurring corrosion processes and the acoustic emission measurements, for specific testing applications.

As will be apparent, one way to monitor a specimen in order to judge its corrosion integrity is to continuously measure the amount of acoustic emission. That is, measuring the number and intensity of the emitted bursts of noise, and then comparing such data with previous observations on specimens of similar size and material that have been tested to failure. With a knowledge of what levels precede failure. It is possible to predict the life of the specimen prior to failure.

There is shown in FIG. 4 the acoustic emission generated when an aluminum panel is subjected to chemical (corrosive) attack by two different corrosive reagents. Curve 21 illustrates the effects of potassium hydroxide (KOH) on a clad 2024-T3 aluminum alloy panel in terms of accumulated counts versus time. The panel was painted with an epoxy primer and then scribed through the coating. Curve 22 similarly illustrates the effect of 1 drop (50 microliters) of a solution of hydrochloric acid placed on the scribed line. The difference in the rate of attack by these two reagents is reflected in the plotted data.

Figure 5:
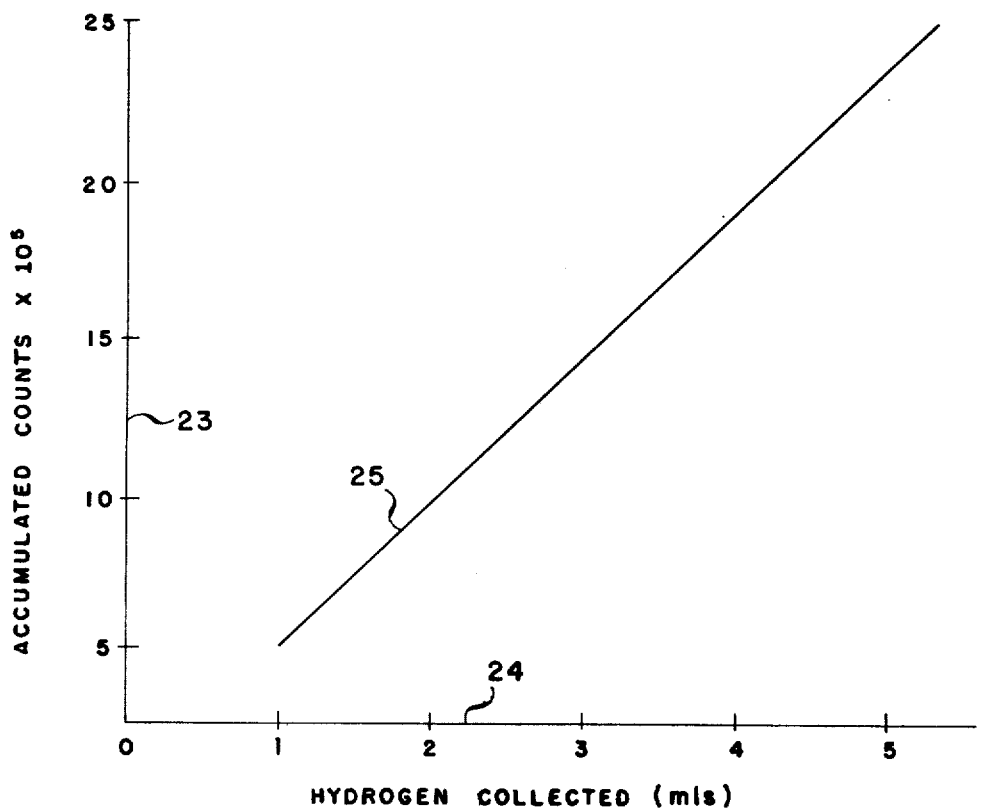
FIG. 5 graphically illustrates the correlation of hydrogen generation and acoustic emission.
Figure 8:
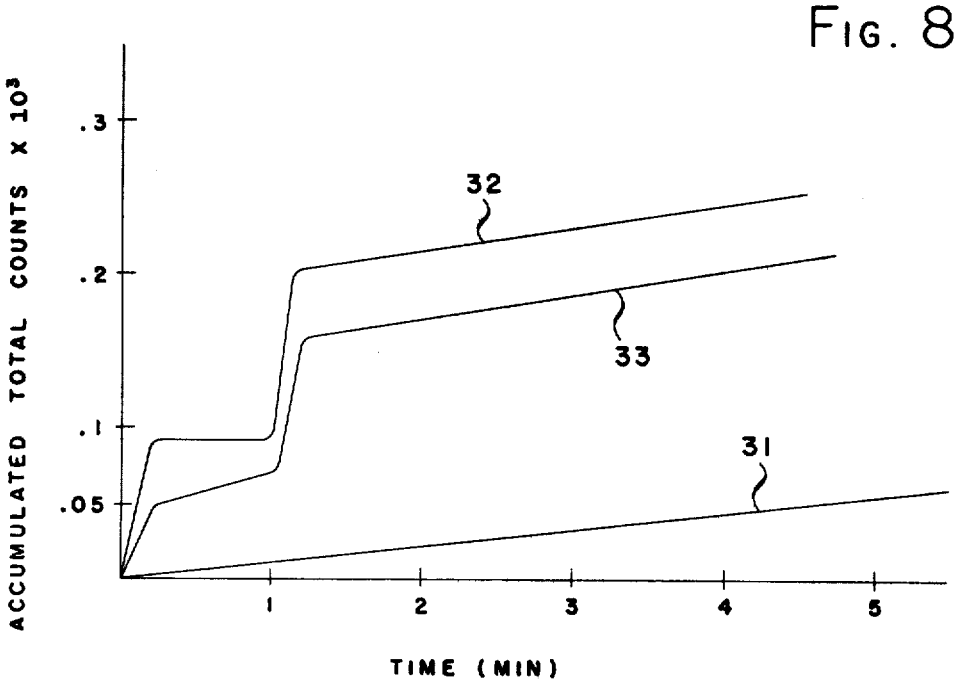
FIG. 8 graphically illustrates filiform corrosion.

There follows a description of specific examples of the novel method of the invention which quantitatively illustrate the correlation between common corrosion reactions and acoustic emission. FIG. 5 comprises a graphic plot in which accumulated pulse counts are plotted along the axis of the ordinate 23 and the volume of hydrogen collected is plotted along the axis of abscissa 24, for the reaction of hydrochloric acid upon an iron wire. The iron wire was placed in a 2N HCl solution. The hydrogen gas evolved was collected simultaneously with the measurement of acoustic emission count rate. As can be seen by line 25, the count rate is linear with the reaction process as measured by hydrogen formation. A similar relationship exists in the reaction of sodium chloride with aluminum wire, and of hydrochloric acid with aluminum wire. This will be discussed in greater detail in connection with FIG. 7. In the absence of reaction occurrences, the acoustic background from the dormant reactants is negligible.

Figure 6:
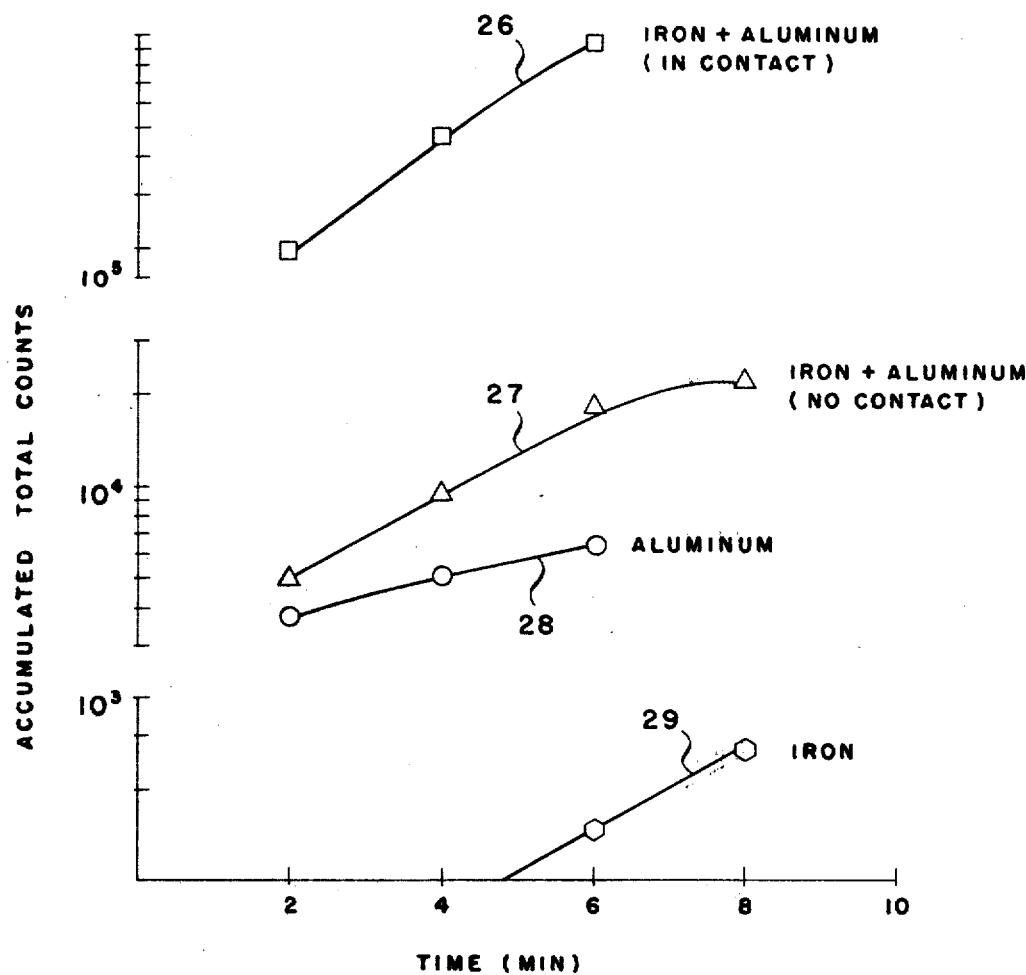
FIG. 6 is a graphic plot illustrating galvanic acceleration of corrosion.

The acoustic emission signal is also a good indicator of increased reaction intensity under the influence of a galvanic couple. There is shown in FIG. 6 the accumulation of increased acoustic counts as a function of increased galvanic effect on corrosion rate. In this example, there is shown iron plus aluminum in contact at 26, iron and aluminum not in contact at 27, aluminum wire only at 28 and iron wire only at 29. The iron wire and the aluminum wire were each placed separately in a 5% sodium chloride (NaCl) solution. The acoustic emission rate was monitored. The experiment was repeated with the two wires in the solution with and without contact. The relatively low rate of counts from iron in 5% (NaCl) solution can be compared with that from aluminum in the same solution. When both are electrically coupled to form a galvanic cell in the solution, the count rate increases greatly, and a coupling of the two metals result in an exponential increase in the count rate.

Figure 7:
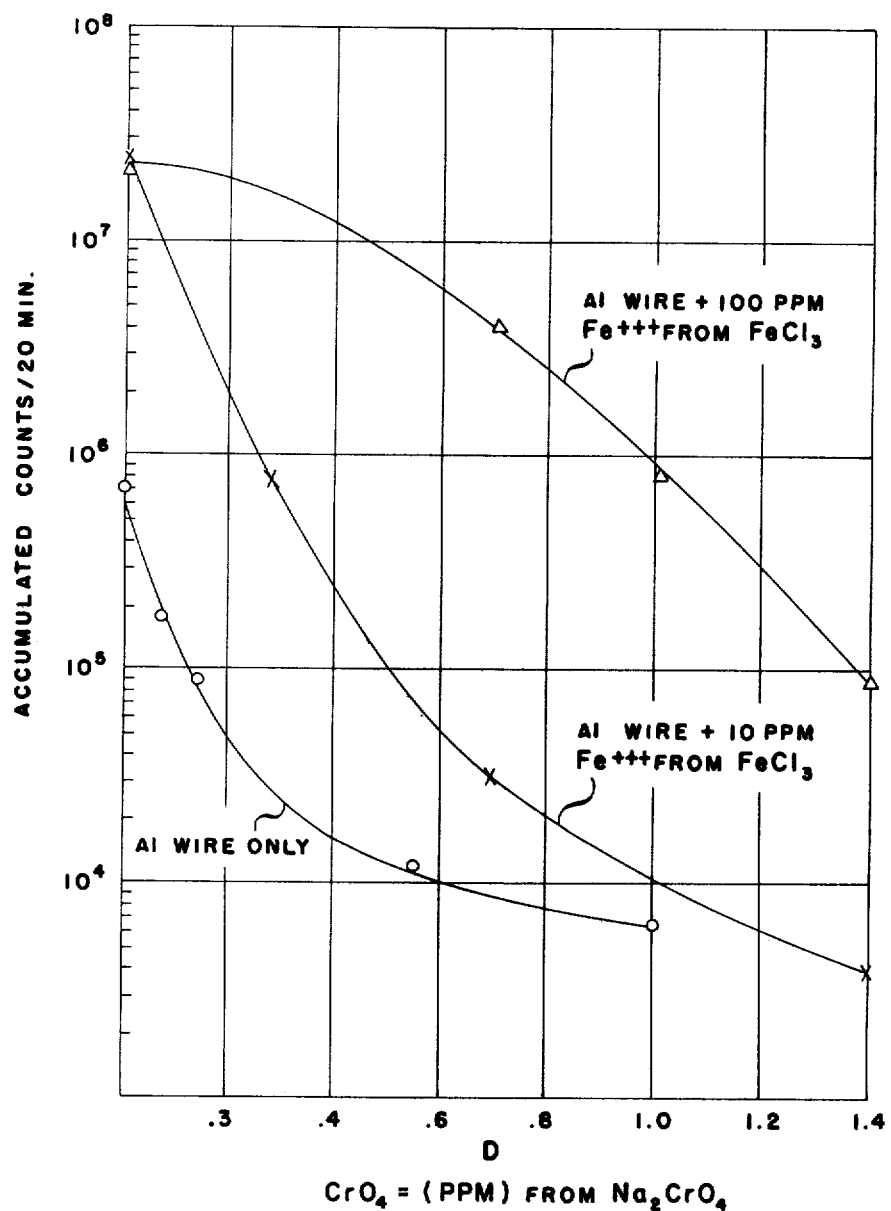
FIG. 7 graphically illustrates the effect of a chromate ion on the acoustic emission of aluminum wire in a salt solution.

FIG. 7 shows the effect of sodium chromate ($Na_2CrO_4$) concentration in suppressing the acoustic emission from aluminum wire corroding in a 5% aqueous salt (NaCl) solution. The addition of ferric chloride ($FeCl_3$), which lowered the pH and introduced a galvanic couple by depositing metallic iron on the wire, necessitated a higher level of chromate ions to suppress the acoustic emissions. The levels of chromate ions necessary to suppress the acoustic signals correlates well with amounts found empirically to inhibit long-term corrosion. When the experiment was repeated using 0.1 N HCl, a relatively high chromate level was found to be necessary to appreciably reduce acoustic emission. In the reaction of iron wire with 1 N HCl, a chromate level of 1000 ppm was found to be effective. In 6 N HCl a 2% level of an amine inhibitor (di-n-propylamine) was required to reduce the count rate.

Figure 9:
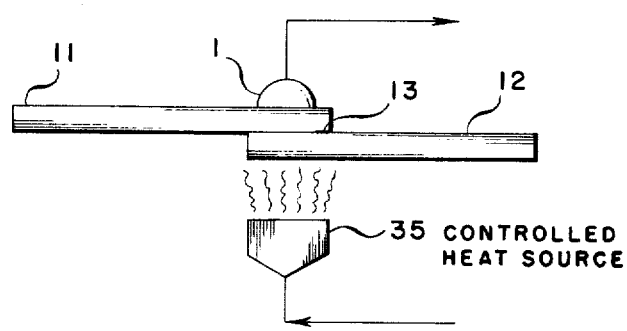
FIG. 9 diagrammatically illustrates the apparatus of FIG. 2 modified to include thermal input.

Filiform corrosion can be detected under a nylon coating by means of the method of the invention. Moisture/temperature acceleration of corrosion rate is illustrated by the use of painted filiform-test panels as shown in FIG. 9. In this example, the specimen comprised clad 2024-T3 aluminum alloy panels painted with a transparent nylon coating. An "X" was scribed diagonally through the coating. In each test a drop of distilled water was placed on the scribe prior to monitoring. Curve 31 illustrates no exposure; curve 32 illustrates recent humidity/temperature exposure at 90% relative humidity at 100°F.; and curve 33 illustrates past humidity/temperature exposure and long storage (corrosion dormant). Also noticeable is the different type of curve resulting from filiform (burst-type) as compared to the generally monotonic functions produced by other corrosion mechanisms.

From the foregoing examples it can be seen that controlled experiments may provide data which can be used for comparison with data obtained from field tests to identify the presence and extent of corrosion in field-test specimens. While it has been found that the acoustic count rate of a specimen having non-visible corrosion is always greater than that of a specimen exhibiting no such corrosion, it is desirable to formulate quantitive comparisons, capable of indicating the extent of corrosion. Even though the acoustic count rate is not a simple linear function of area percent corroded, it gives a useful assessment of the intensity of the proceeding reaction. A library of acoustic signatures, presented as accumulated total counts versus time, for various kinds of standard specimens may be produced. Also, there are other parameters of interest in the analysis of acoustic emission signals. These additional parameters include rate of emission, and amplitude of emission. These parameters may be correlated with standard corrosion samples in much the same way as the previously described total-cumulative-count versus time correlation.

The novel method of the invention also contemplates the inclusion of controlled environments both in establishing standard emission samples, and in making field tests. There is shown in FIG. 9 apparatus as also shown in FIG. 2, but with the further addition of a controlled heat source 35. This source 35 may comprise a quartz infra-red heat lamp, an electrical resistance heating element, or the like, capable of supplying a controlled amount of thermal energy to the corrosion-suspect joint 13. This thermal energy input will accelerate common corrosion reactions and thereby simplify or hasten the acquistion of output data. Also, in certain corrosion reactions, the addition of super-ambient thermal energy to the area of corrosion will increase the rate of acoustic output or the amplitude of acoustic output, or both.

Figure 10:
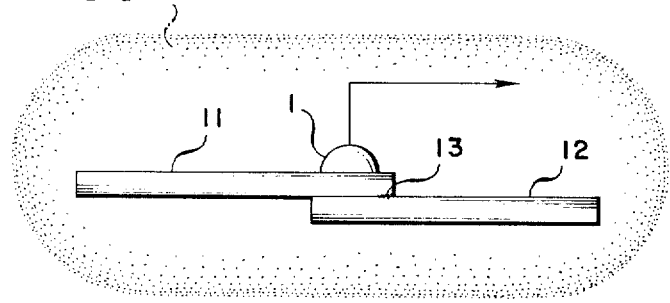
FIG. 10 diagrammatically illustrates the apparatus of FIG. 2 modified to include a controlled high-humidity atmosphere.

Other aggressive environments, in addition to elevated temperatures, may be employed to enhance or accelerate the acoustic emission products of corrosion. For example, there is shown in FIG. 10 the use of a controlled high-humidity atmosphere 36 surrounding the corrosion-suspect joint 13. This may comprise any suitable and well-known controlled-humidity chamber. It can be demonstrated that a correlation exists between acoustic signal patterns after environmental exposure and the corresponding hidden corrosion damage.

In summary, from the foregoing it will be seen that there is provided by the present invention a novel and improved method for the detection and monitoring of corrosion. The corrosion reaction may be measured in terms of a plurality of variables such as temperature versus time, humidity versus time, amplitude-of-acoustic-output versus time or temperature, rate-of-acoustic-output as a function of time, humidity, or temperature, etc. In all cases, the acoustic emission variable, as a function of another independent physical variable, such as time, humidity, etc., is obtained from the known corrosion sample or standard, for subsequent comparison and/or correlation with a specimen to be tested. Although the invention has been shown and described in terms of a method applied to corrosion reactions per se, it will be obvious that similar chemical reactions such as etching, paint stripping, electroplating, adhesive bonding, and chemical milling may be detected and monitored in a like manner. The application of the novel method of the invention to these analogous chemical reactions will be readily apparent to those versed in the art.

What is claimed is:

1. A non-destructive chemical-reaction testing method utilizing an electroacoustic sensing and recording device of the type comprising an acoustic transducer for picking up acoustic emissions, a signal processor responsive to the output of the transducer for providing discrete output pulses corresponding to each of the acoustical emissions picked up by the transducer, and a counter for accumulating, and providing an indication of, the discrete pulses from the processor, comprising the steps of:

acoustically coupling said transducer to a first specimen which is subject to and
undergoing a continuous progressing chemical reaction of interest having known chemical process parameters for picking up acoustical emissions therefrom;

making a first fixed-interval recording of the pulses accumulated by said counter in response to said progressing chemical reaction as a function of a single given continuous physical parameter, and thereby establish a standardized acoustic signature corresponding to said first specimen;

acoustically coupling said transducer to a second specimen which is to be tested for the purpose of measuring any progressing chemical reaction extant therein; making a second fixed-interval recording of all pulses accumulated by said counter as a result of subjecting said second specimen to a like degree of said single given continuous physical parameter and for a like interval; and comparing said first and second recordings to obtain a degree of correlation therebetween, the existence of a positive correlation being indicative of the existence of the chemical reaction of interest in said second specimen, and the existence of a negative correlation indicating an absence of said chemical reaction of interest.

2. The testing method as defined in claim 1 wherein said progressing chemical reaction comprises, a corrosion reaction capable of emitting acoustic energy.

3. The testing method as defined in claim 1 including: measuring the amplitude of the pulses from said processor to provide an indication of the magnitude of said progressing chemical reaction.

4. The testing method as defined in claim 1 including: integrating the repetition rate of the pulses from said signal processor; and displaying the instantaneous pulse repetition rate obtained in said measuring step.

5. The testing method as defined in claim 1 including: applying a controlled environment to said second specimen for enhancing the activity of any chemical reaction extant therein.

* * * * *